United States Patent [19]

Yamagiwa

[11] Patent Number: 5,788,308
[45] Date of Patent: Aug. 4, 1998

[54] VEHICLE BODY STRUCTURE INCLUDING SPARE WHEEL HANGING DEVICE

[75] Inventor: Takahisa Yamagiwa, Atsugi, Japan

[73] Assignee: Nissan Motor Co., Ltd., Kanagawa, Japan

[21] Appl. No.: 649,567

[22] Filed: May 17, 1996

[30] Foreign Application Priority Data

May 18, 1995 [JP] Japan .................. 7-118838

[51] Int. Cl.[6] .................................. B62D 43/04
[52] U.S. Cl. ............... 296/37.2; 224/42.23; 414/463
[58] Field of Search .................... 296/37.2; 414/463, 414/465, 466; 224/42.12, 42.21, 42.23, 42.3

[56] References Cited

U.S. PATENT DOCUMENTS

| | | | |
|---|---|---|---|
| 2,028,945 | 1/1936 | Morrison | 296/37.2 X |
| 2,688,372 | 9/1954 | Walker | 296/37.2 X |
| 3,005,657 | 10/1961 | Walker | 296/37.2 |
| 4,095,709 | 6/1978 | Eller | 298/37.2 X |
| 5,076,629 | 12/1991 | Peters et al. | 296/37.2 |

FOREIGN PATENT DOCUMENTS

| | | | |
|---|---|---|---|
| 912664 | 7/1949 | Germany | 296/37.2 |
| 4-119285 | 10/1992 | Japan . | |
| 4-345582 | 12/1992 | Japan . | |

*Primary Examiner*—Joseph D. Pape
*Attorney, Agent, or Firm*—Lowe, Price, LeBlanc & Becker

[57] ABSTRACT

An automotive vehicle body structure comprises a cross member which is disposed below a rear floor panel and formed of plate material. The cross member has front and rear end walls which are respectively formed with front-side and rear-side through-holes. A cylindrical member is disposed in a manner to connect the front-side and rear-side through-holes. The rear-side through-hole is covered with a back door in a closed state. A spare wheel hanging device includes an operational section by which a spare wheel is operated. The operational section is located such that the axis of the cylindrical member reaches the operational section. An operational handle is guided through the cylindrical member to the operational section of the spare wheel hanging device so as to operate the spare wheel.

8 Claims, 3 Drawing Sheets

VEHICLE BODY STRUCTURE INCLUDING SPARE WHEEL HANGING DEVICE

BACKGROUND OF THE INVENTION

1. Field of the Invention

This invention relates to improvements in a vehicle body structure including a spare wheel hanging device, and more particularly to a structure by which an operational handle of the spare wheel hanging device is guided to an operational section for the spare wheel.

2. Description of the Prior Art

A variety of structures for guiding an operational handle of a spare wheel hanging device have been proposed and put into practical use. An example of such structures is disclosed in in Japanese Patent Provisional Publication No. 4-345582, in which the operational handle is guided from an operational handle guiding structure disposed in a bumper to an operational shaft of a chain winding device as the spare wheel hanging device. A chain to which a spare wheel is attached is wound or unwound by turning the operational handle thereby attaching or detaching the spare wheel at a spare wheel storing position in the spare wheel hanging device.

However, in such a conventional technique, the operational handle guiding structure is disposed in the bumper and therefore in a condition to be exposed out of the vehicle body. Accordingly, the operational shaft of the chain winding device can be easily operated from the outside of the vehicle body if a suitable operational handle is used. This is disadvantageous from the view point of protecting the spare wheel from being stolen. Additionally, an opening through which the operational handle is inserted is in a state to be opened to the outside of the vehicle body, and therefore disadvantageous from the view point of external appearance of the vehicle body.

SUMMARY OF THE INVENTION

It is an object of the present invention to provide an improved vehicle body structure including a spare wheel hanging device, which can effectively overcome drawbacks encountered in conventional similar vehicle body structures including a spare wheel hanging device.

Another object of the present invention is to provide an improved vehicle body structure including a spare wheel hanging device, which can effectively protect a spare wheel in the hanging device from being stolen, while improving an external appearance of the vehicle body.

A further object of the present invention is to provide an improved vehicle body structure including a spare wheel hanging device, in which a hole through which an operational handle of the hanging device is insertable to operate the spare wheel is located inside or covered with an openable member (such as a back door) in a closed state.

A vehicle body structure of the present invention comprises a rear floor panel of a vehicle body. A cross member is formed of plate material and fixedly connected to the rear floor panel to form a structure which defines a space therein. A door member is disposed at a rear section of the vehicle body to cover at least a part of surface of an end wall of the cross member when the door member is in a closed state. A spare wheel hanging device is fixedly disposed below the rear floor panel and including an operational section through which a spare wheel is operated, and a separable operational handle having a straight section, the handle being connectable to the operational section so as to operate the operational section. In the above-structure, the cross member is formed with a passage through which the straight section of the handle passes. The passage pierces the cross member in a generally fore-and-aft direction relative to the vehicle body. The passage has an end located to be covered with the door member in a closed state. The straight section of the handle is insertable through the end of the passage. Additionally, the operational section of the spare wheel hanging device is located in a position to which extension of the passage reaches.

With the above arrangement, the passage for the operational handle of the spare wheel hanging device is formed through the confined space formed by the cross member and the rear floor panel, to extend generally in the fore-and-aft direction of the vehicle body. Additionally, the operational section of the spare wheel hanging device is located in a position to which the extension of the passage reaches. Accordingly, the operational handle of the spare wheel hanging device is guided through this passage and can smoothly reach the operational section of the spare wheel hanging device, so that the attachment or detachment operation of the spare wheel relative to the hanging device can be effectively accomplished. Furthermore, the end (through which the operational handle is insertable in the passage) of the passage is covered with the door member when the door member is closed. Accordingly, the attachment and detachment operations of the spare wheel relative to the hanging device cannot be accomplished unless the door member is opened. As a result, the spare wheel can be prevented from being unnecessarily detached from the spare wheel hanging device, thereby protecting the spare wheel from being stolen. Additionally, the passage or the end thereof cannot be seen in the condition where the door member is closed, thereby improving the external appearance of the vehicle body.

DETAILED DESCRIPTION OF THE INVENTION

Figure 1:
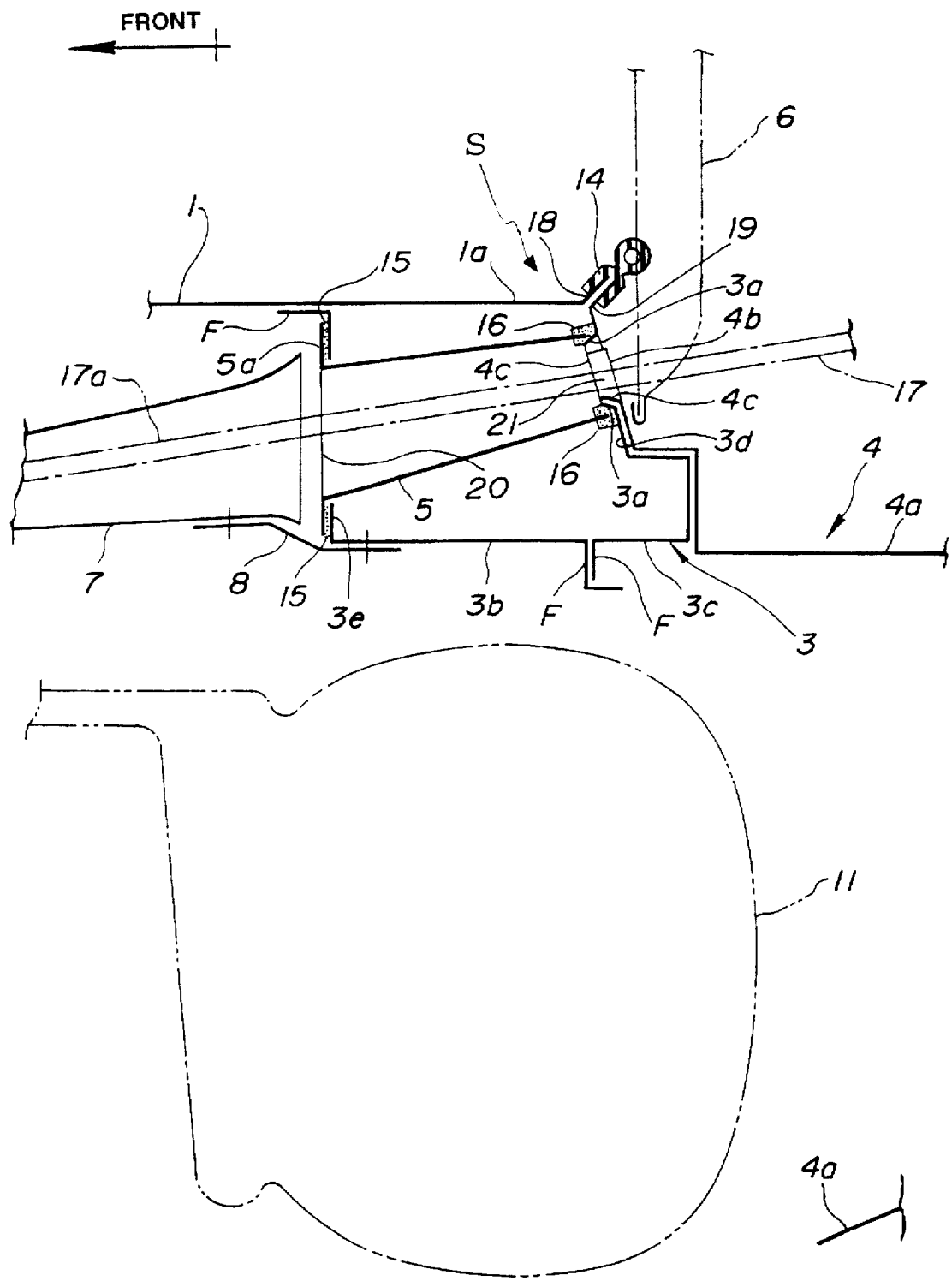
FIG. 1 is a schematic fragmentary cross-sectional view of an embodiment of a vehicle body structure including a spare wheel hanging device, according to the present invention.
Figure 2:
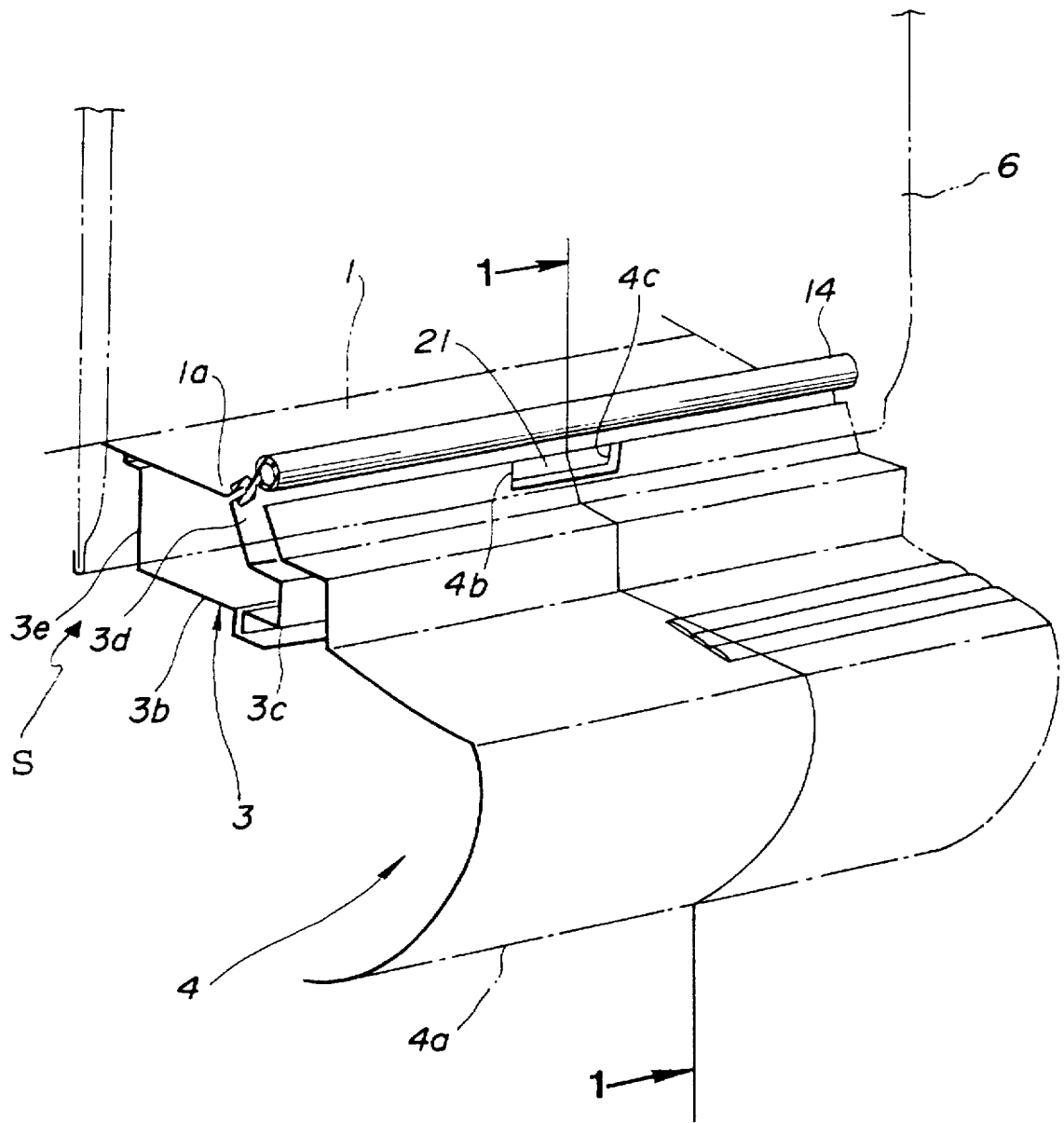
FIG. 2 is a schematic fragmentary perspective view of an essential part of the vehicle body structure of FIG. 1, in which the cross-sectional view of FIG. 1 is taken in the direction of arrows substantially along the line 1—1 of FIG. 2.
Figure 3:
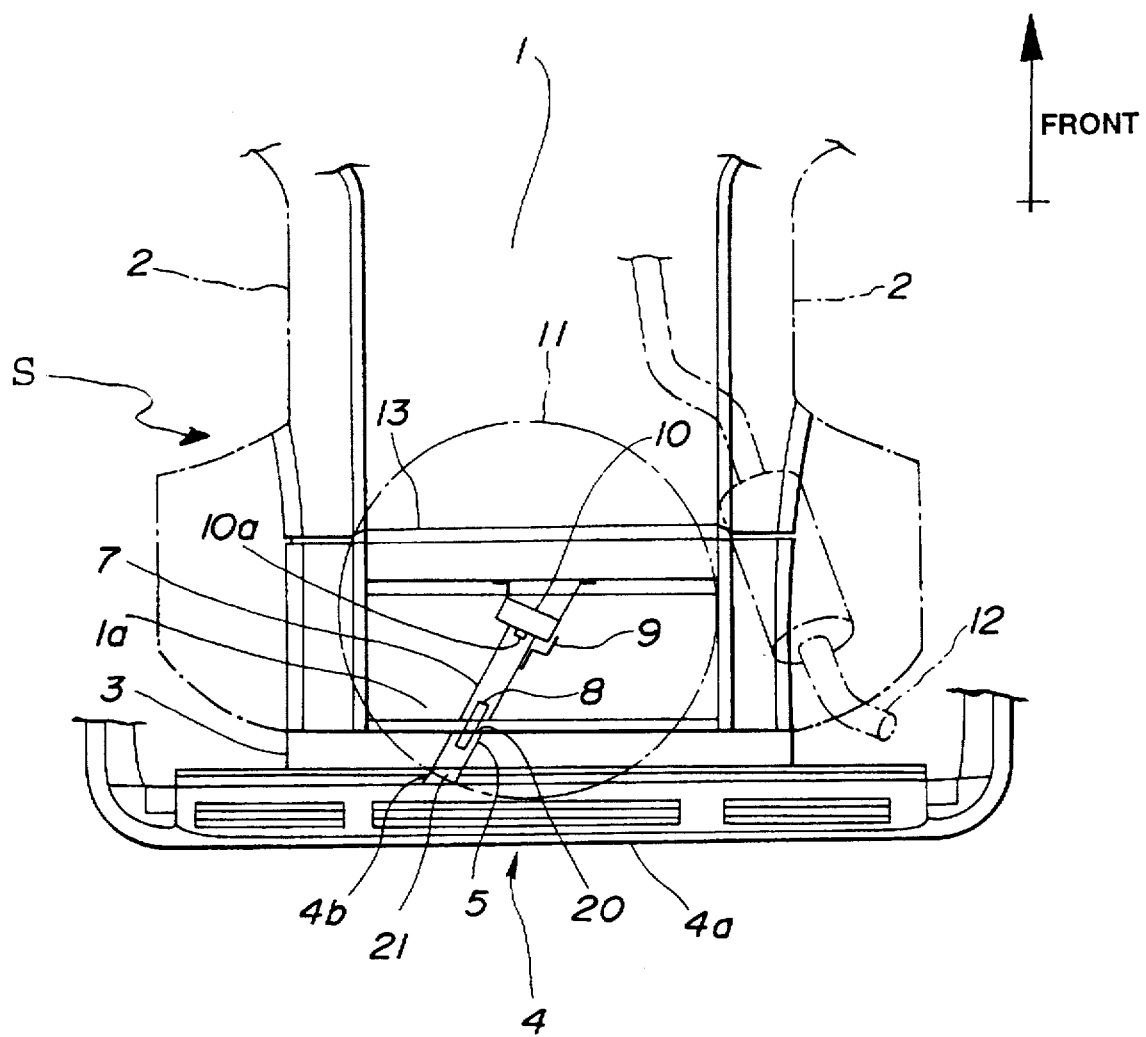
FIG. 3 is a schematic fragmentary plan view of the vehicle body structure of FIG. 1.

Referring now to FIGS. 1 to 3, a preferred embodiment of a vehicle body structure including a spare wheel hanging device 10, according to the present invention is illustrated by the reference character S. The vehicle body structure S comprises a rear floor panel 1 forming part of a floor panel of an automotive vehicle. Two opposite rear side members 2 are disposed parallel with each and extending longitudinal of the vehicle body of the automotive vehicle.

Each rear side member 2 is fixed to the rear floor panel 1 and has such a cross-section as to form an endless loop shape in cross section together with the rear floor panel 1 upon being fixed to the rear floor panel 1, so that a closed or confined space is defined between each rear side member 2 and the rear floor panel 1.

A first cross member 3 formed of steel plates is disposed perpendicular to the rear side members 2 and extends along the rear end section 1a of the rear floor panel 1 in a manner to connect the opposite rear side members 2. Similarly, a second cross member 13 is disposed perpendicular to the rear side members 2 and extends in a lateral or width direction of the vehicle body in a manner to connect the opposite side members 2, 2. As shown in FIGS. 1 and 2, the laterally extending upper portion of a rear end wall 3d of the cross member 3 and the rear end section 1a of the rear floor panel 1 are covered with a back door (as an openable and closable member) 6 which is in a closed state.

A spare wheel (with a tire) hanging device 10 is disposed or connected to the second cross member 13 and functions to hang a spare wheel (with a tire) 11 below the rear floor panel 1. The spare wheel hanging device 10 has a chain (not shown) so that the spare wheel is fixable to the tip end of the chain. The spare wheel hanging device 10 includes an operational section 10a which is located rear of the cross member 13. The operational section 10a is arranged such that the straight section 17a of an operational handle 17 is brought into engagement therewith and turned around its axis to wind or unwind the chain so as to vertically move the spare wheel 11 relative to the lower surface of the rear floor panel 1. The spare wheel 11 is brought into an upper position to be fixed below the rear floor panel 1 when the chain is wound, while it is brought into a lower position to be removed from the chain to be used. The spare wheel hanging device 10 (with the operational section 10a) of this type is, for example, disclosed in Japanese Utility Model Publication No. 4-119285, and therefore the detail explanation of the device is omitted for the purpose of simplicity of illustration.

The cross member 3 is made up of front section 3b and rear section 3c which extend laterally or in the width direction of the vehicle body. The front and rear sections 3b, 3c are joined with each other and further joined to the rear floor panel 1 in such a manner as to form an endless loop shape in cross-section so that a closed or confined space is defined among front and rear sections 3b, 3c and the rear floor panel 1. Each of the front and rear sections 3b, 3c and the rear floor panel 1 has at least one flange portion 18, 19, F through which front and rear sections 3b, 3c and the rear floor panel 1 are fixedly joined to each other. A weather strip 14 is bonded to cover the flange portions 18, 19 of the rear floor panel 1 and the cross member rear section 3c to seal a clearance between the flange portions 18, 19 and the back door 6.

As shown in FIG. 1, the front section 3b of the cross member 3 is formed at its front end wall 3e with a through-hole 20. The rear section 3b of the cross member 3 is formed at its rear end wall 3d with a through-hole 21. The through-hole 20 of the front section 3b is located lower than the through-hole 21 of the rear section 3b relative to the vehicle body. It will be understood that the through-hole 21 is positioned at the laterally extending upper portion of the rear end wall 3d of the rear section 3c and therefore is covered with the back door 6 when the back door 6 is closed. The rear end wall 3d is formed with a forwardly extending cylindrical flange 3a having a generally frustoconical surface, defining the through-hole 21.

A generally cylindrical member 5 has a generally frustoconical surface and is disposed to extend from the through-hole 20 to the through-hole 21 in such a manner that the extension of an axis (not shown) of the cylindrical member 5 reaches the operational section 10a of the spare wheel hanging device 10. The cylindrical member 5 is formed at its front end with an annular flange 5a which is located along the outer surface of the front end wall 3e of the front section 3b of the cross member 3. The flange 5a is fixedly secured to the front end wall 3e by means of weld nuts, bolts and/or the likes though not shown. The rear end section of the cylindrical member 5 is fitted around the outer periphery of the forwardly extending cylindrical flange 3a of the rear section 3c. A sealing member 15 is disposed between the front end wall 3e of the front section 3b of the cross member 3 and the annular flange 5a of the cylindrical member 5 thereby to seal the clearance formed between them.

Similarly, a sealing member 16 is disposed between the cylindrical flange 3a of the rear section 3c of the cross member 3 and the rear end section of the cylindrical member 5 thereby to seal the clearance formed between them.

A bumper 4 is disposed rear of the cross member 3 and extends parallel with the cross member 3. The bumper 4 has a bumper facia 4a which projects rearwardly of the vehicle body. The bumper facia 4a is formed with a cutout 4b located corresponding to the through-hole 21 of the rear section 3c of the cross member 3, and covers the rear end wall 3d except for the through-hole 21. A flange 4c having the generally ]-shaped cross-section is formed integral with the bumper facia 4a and located along the opposite side and lower peripheries of the cutout 4b. The flange 4c extends in the through-hole 21 of the rear section 3c of the cross member 3 in a manner to cover the cylindrical flange 3a of the cross member rear section 3c.

Another cylindrical member 7 is disposed between the cylindrical member 5 and the operational section 10a of the spare wheel hanging device 10. The cylindrical member 7 is fixed in position through a rear bracket 8 and a front bracket 9, and located in such a manner that its axis is aligned with that of the cylindrical member 5. The rear bracket 8 is disposed to fixedly connect the cylindrical member 7 to the front section 3b at the lower surface, while the front bracket 9 is disposed to fixedly connect the cylindrical member 7 to the spare wheel hanging device 10 through screws, weld nuts, bolts and/or the likes (not shown).

Next, functions of the vehicle body structure including the spare wheel hanging device 10 will be discussed hereinafter.

In order to accomplish attachment and detachment of the spare wheel 11 relative to the spare wheel hanging device 10, the tip end of the straight section 17a of the operational handle 17 is guided through the through-holes 20, 21 (defining a passage for the operational handle) to reach the operational section 10a of the spare wheel hanging device 10. Then, the straight section 17a is turned around its axis. As a result, the chain to which the spare wheel 11 is fixed is wound to lift up and fix the spare wheel 11 in position in the spare wheel hanging device, or unwound to lift down and detach the spare wheel 11 from the spare wheel hanging device 10.

The rear-side through-hole 21 at the rear end wall 3d of the cross member 3 is covered with the back door 6 disposed at the rear end section of the vehicle body, and therefore the attachment and detachment operations of the spare wheel cannot be made unless the back door 6 is opened. Accordingly, the spare wheel 11 can be prevented from being unnecessarily removed from the spare wheel hanging device 10, thereby effectively protecting the spare wheel from being stolen. Additionally, the rear-side through-hole 21 cannot be seen in a state where the backdoor 6 is closed, thereby improving the external appearance of the vehicle body.

Furthermore, the straight section 17a of the operational handle 17 is guided toward the operational section 10a of the spare wheel hanging device 10 through the cylindrical member 5 bridging the rear end and front-side through-holes 20, 21. Therefore, the operational handle straight section 17a can be smoothly passed through the space confined by the cross member 3 and the rear floor panel 1, thereby improving the operationability of the operational handle 17.

Here, the sealing members 15, 16 are disposed respectively in the clearance between the front end section of the cylindrical member 5 and the front end wall 3e of the cross member 3 and in the clearance between the rear end section of the cylindrical member 5 and the rear end wall 3d of the cross member 3, and therefore water outside the vehicle body can be prevented from penetrating into the space inside the cross member 3, thereby protecting the vehicle body from being rusted or the like.

Additionally, exhaust gas discharged from an exhaust pipe 12 (shown in FIG. 3) at the rear end section of the vehicle body can be prevented from penetrating into space inside the cross member 3 through the above clearances thereby avoiding penetration of exhaust gas into a passenger compartment through the joining sections of the rear floor panel 1 and the cross member 3. Further, in this embodiment, the rear-side through-hole 21 is located outside of the passenger compartment relative to the weather strip 14 filling the clearance between the back door 6 and the floor panel 1, and therefore exhaust gas penetrating through the front-side through-hole 20 of the cross member 3 is prevented from being introduced through the rear-side through-hole 21 to penetrate into the passenger compartment.

The cylindrical member 5 is provided at its front end section with the annular flange 5a, and therefore locating the base section (the front end section in this embodiment) of the cylindrical member 5 can be easily accomplished when the cylindrical member is inserted into the front-side and rear-side through-holes 20, 21. Additionally, water penetrating into the cylindrical member 5 can be prevented from penetrating into the space inside the cross member 3 through the clearance between the cylindrical member 5 and the cross member 3, thereby contributing to improvements in waterproof of the vehicle body. Furthermore, a peripheral portion around the front-side through-hole 20 in the front end wall 3e is covered with the front end section (including the annular flange 5a) of the cylindrical member 5, and therefore the peripheral portion around the front-side through-hole 20 can be prevented from being injured upon intefering with the operational handle 17.

The rear end section of the cylindrical member 5 is fitted around the forwardly extending cylindrical flange 3a of the rear section 3c of the cross member 3 which flange 3a is formed at the periphery of the rear-side through-hole 21. Consequently, guidance and location of the tip end section (the front end section in this embodiment) of the cylindrical member 5 can be easily accomplished when the cylindrical member 5 is inserted into the front end and rear-side through-holes 20, 21.

Moreover, in this embodiment, since the rear-side through-hole 21 is located higher in level than the front-side through-hole 20, water to penetrate the cylindrical member 5 is introduced through the forwardly extending flange 3a and smoothly flows through the thus inclined cylindrical member 5. Accordingly, water at the rear end section of the vehicle body can be prevented from penetrating into the space inside the cross member 3, so that water-sealing ability of the vehicle body can be improved as compared with a case in which only the sealing member 16 is disposed between the rear end section of the cylindrical member 5 and the rear end wall 3d of the cross member 3 for the purpose of sealing.

The cylindrical member 5 is provided at its front end section with the annular flange 5a located along the outer surface of the cross member 3, and therefore water reaching the front-side through-hole 20 through the inner surface of the cylindrical member 5 is smoothly drained out through the annular flange 5a so as to prevent water from penetrating into the space inside the cross member 3. Additionally, the operation for locating the cylindrical member 5 is accomplished with both the front and rear side sections of the cylindrical member 5 thereby improving the operational efficiency of installation of the cylindrical member 5 in position.

The bumper facia 4a is located to cover the lower and side peripheral parts of the rear-side through-hole 21, and therefore the operational handle 17 can be prevented from interfering with the vehicle body thereby to protect a painted surface or the like of the vehicle body from being injured upon missing the hold of the operational handle 17 when the operational handle 17 is inserted into the rear-side through-hole 21 of the cross member 3.

Additionally, in this embodiment, the flange 4c at the periphery of the cutout 4b is formed projecting into the rear-side through-hole 21 and covering the forwardly extending flange 3a of the cross member 3, and therefore the vehicle body can be further prevented from being injured.

Furthermore, since another cylindrical member 7 is disposed between the front-side through-hole 20 and the operational section 10a of the spare wheel hanging device 10, the operational handle 17 can be guided further easily to the operational section 10a, while the operational handle 17 cannot be guided to the operational section 10a without being passed through the through-holes 20, 21 so as to provide advantages from the view point of protecting the spare wheel from being stolen.

While the back door 6 has been shown and described as the openable and closable member in the above embodiment, it will be understood that the openable and closable member may be a deck lid which extends downward to reach the rear section of the vehicle body. Although the forwardly extending flange 3a of the cross member 3 has been shown and described as being formed around the rear-side through-hole 21, it will be appreciated that the flange 3a may be formed around the front-side through-hole 20, in which the cylindrical member 5 is inserted firstly through the rear-side through-hole 20. Similarly, the annular flange 5a may be formed at the rear end section of the cylindrical member 5 so as to be located rear of the rear-side through-hole 21, in which a part of the cross member rear end wall 3d around the periphery of the rear-side through hole 21 is covered with the annular flange 5a thereby preventing the vehicle body from being accidentally injured when the operational handle. 17 is inserted through the rear-side through-hole 21. Additionally, the bumper facia 4a may cover the whole parts around the periphery of the rear-side through-hole 21 of the cross member 3.

What is claimed is:

1. A vehicle body structure comprising:

a rear floor panel of a vehicle body a cross member formed of plate material and fixedly connected to said rear floor panel to form a structure which defines a space therein, and said cross member having an end wall with at least one surface;

a door member disposed at a rear section of the vehicle body to cover at least a part of said surface of an end wall of said cross member when said door member is in a closed state;

a spare wheel hanging device fixedly disposed below said rear floor panel and including an operational section through which a spare wheel is operated, and a separable operational handle having a straight section, said handle being connectable to said operational section so as to operate said operational section;

wherein said cross member includes means defining a passage through which the straight section of said handle passes, said passage piercing said cross member in a generally fore-and-aft direction relative to the vehicle body, said passage having an end located to be covered with said door member in a closed state, said straight section of said handle being insertable through said end of said passage; and said operational section of said spare wheel hanging device is located in a position to which extension of said passage reaches.

2. A vehicle body structure as claimed in claim 1, further comprising a generally cylindrical member defining therein said passage, a major part of said cylindrical member being located inside said cross member.

3. A vehicle body structure as claimed in claim 2, wherein said cross member has the first end wall and a second end wall which are separate from each other in the fore-and-aft direction, wherein said cylindrical member includes first and second end sections which are secured to said first and second end walls of said cross member through first and second sealing members, respectively.

4. A vehicle body structure as claimed in claim 3, wherein said cylindrical member has a generally cylindrical flange which is located along an outer surface of said cross member, said flange being located at one of the first and second end sections of said cylindrical member.

5. A vehicle body structure as claimed in claim 4, wherein one of said first and second end walls of said cross member includes a generally cylindrical flange extending inward of the cross member, one of said first and second end sections of said cylindrical member being fittable around an outer periphery of said cylindrical flange.

6. A vehicle body structure as claimed in claim 5, wherein said passage defining means includes means defining first and second through-holes forming part of said passage, said first and second through-holes being formed respectively in said first and second end walls of said cross member, said second through-hole being located nearer to said operational section of said spare wheel hanging device than said first through-hole, said second through-hole being located lower in level than said first through-hole relative to the vehicle body, wherein the first and second end sections of said cylindrical member being respectively fixed to the first and second end walls of said cross member, said cylindrical flange of said cylindrical member being located at the second end section of said cylindrical member, the first end section of said cylindrical member being fittable around the cylindrical flange of said first end wall of said cross member.

7. A vehicle body structure as claimed in claim 1, wherein the structure to be formed by said cross member and said rear floor panel has a generally endless loop shape in cross section to define therein the space.

8. A vehicle body structure comprising:

a rear floor panel of a vehicle body;

a cross member connected to said rear floor panel, and having a front end wall and a rear end wall;

a passage defined in the cross member and extending from said front end wall to said rear end wall;

a spare wheel hanging device fixedly disposed below said rear floor panel and in front of said cross member so as to be operated by a handle device within said passage; and a door member disposed at a rear section of the vehicle body to cover at least said passage when said door member is closed.

* * * * *